March 13, 1956 — G. CANDOLINI — 2,738,110
LUBRICATING APPLIANCE FOR WATCHES AND THE LIKE
Filed July 14, 1950
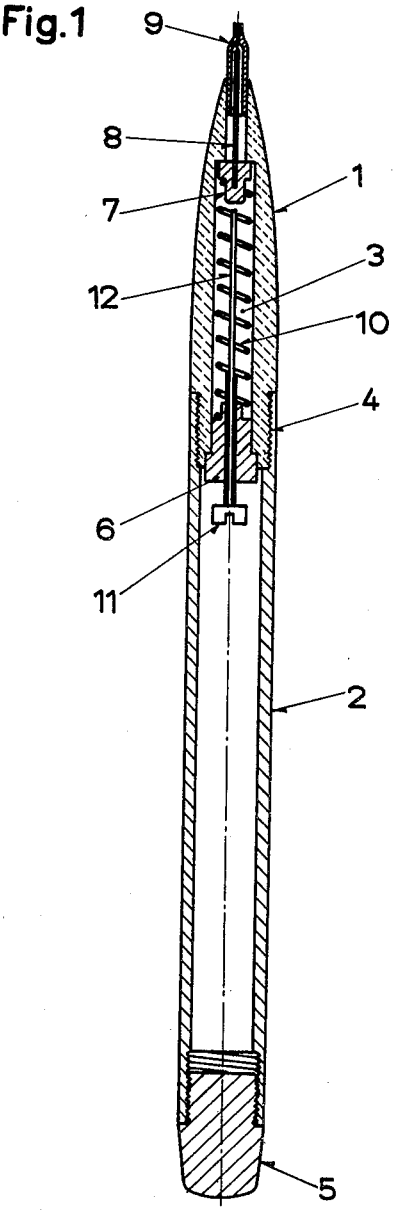
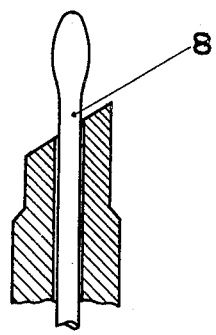
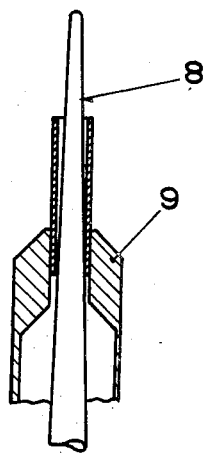
INVENTOR
GIUSEPPE CANDOLINI
BY Bertram Ottinger
ATTORNEY

2,738,110
LUBRICATING APPLIANCE FOR WATCHES AND THE LIKE

Giuseppe Candolini, Lausanne, Switzerland

Application July 14, 1950, Serial No. 173,771

Claims priority, application Switzerland July 15, 1949

3 Claims. (Cl. 222—322)

It is well known that the lubricating of watches and other small precision instruments is an extremely difficult operation because even a slight excess of lubricant at a lubrication point may be sufficient to jeopardize the running accuracy of such precision instruments. Lubricating appliances enabling the quantity of lubricant applied to be accurately dosed are so far unknown. As a rule, lubrication is at present effected by means of needles which, when dipped in an oil container, retain minute quantities of oil by surface tension, and deposit said oil on the bearing point when subsequently placed in contact therewith. This method is time-wasting and does not permit of precise dosage of the lubricant applied.

Lubricating appliances, however, are known in which a tube projecting from a casing is connected with a plunger which is movably accommodated in the oil container and usually acted upon by a spring. When this tube is depressed, the space in the oil container is reduced by the corresponding movement of the plunger and the oil emerges through the tube. Such appliances are not suitable, however, for the discharge of minute quantities of lubricant.

As against the known lubricating appliances referred to above, the lubricating appliance according to this invention is characterized by the fact that the plunger is accommodated in the oil reservoir with a certain clearance allowing oil to pass and bears against the front end of said oil reservoir in sealing relation, that the needle mounted on the plunger is solid and guided in a nozzle, and that adjustable means projecting into the oil container are provided for the purpose of limiting the plunger stroke.

In the attached drawing a number of embodiments of the invention are shown by way of example in Figs. 1–3, in which Fig. 1 is a section through the lubricating appliance, and Figs. 2 and 3 show specific forms of the nozzle and needle.

Referring now more particularly to Fig. 1 of the drawing, a casing shaped like a propelling pencil consists of a front part 1 and a rear part 2. A bore 3 constituting the oil reservoir is provided in part 1. The two parts 1 and 2 may be screwed together as by thread 4. The tubular part 2 is closed by a screwed-in plug 5 and the bore 3 of the front part 1 is closed by an inserted or screwed-in plug 6. The plunger 7 provided in the front section of bore 3 is connected with the needle 8, said needle being guided in a sleeve 9 which provides a passageway connecting the front of bore 3 with the outer surface of the casing. The outlet terminal of the passageway is constricted to form a nozzle through which oil is dispensed. The annular space under the plunger 7 between the needle and sleeve is non-capillary; however, the annular space between the tip of the needle and the nozzle is capillary. The plunger 7 is acted upon by the spring 10 bearing against the plug 6. As shown in the drawing, the plunger is accommodated in the oil reservoir with a certain clearance so that oil may flow past it to the sleeve 9. A screw 11 is threaded into the plug 6 the elongation 12 of which projects towards the plunger 7.

The manner in which the described lubricating appliance functions is, briefly, as follows:

The oil container 3 is filled after removal of plug 6. After said plug 6 has been replaced and both parts 1 and 2 have been screwed together, the appliance is ready for use. The entire needle 8 projects from the tip of the sleeve 9 and a slight pressure exerted thereon suffices to raise the plunger 7 bearing on bore 3 in sealing relation against the pressure of the spring 10. Oil is now present in the non-capillary space forward of the plunger 7 and along the needle 8 and the sleeve 9, without, however, emerging due to the capillary space between the tip of the needle and the nozzle. When the appliance is slowly lifted off the lubrication point, the sleeve 9 is lifted off with the needle 8 still remaining on the lubrication point. The closing movement of the plunger 7 thereby caused produces an over-pressure in the annular non-capillary space forward of plunger 7 and at this moment oil will flow along the needle through the capillary space between the nozzle and tip of the needle onto the point to be lubricated. It is readily understandable that the quantity of outflowing oil is determined by the stroke of plunger 7. The farther said plunger is displaced from its rest, the larger the pressure space and consequently the emerging quantity of oil becomes. The screw 11 is provided in order to adjust the quantity discharged which screw limits the plunger stroke by means of its elongation 12. It thus becomes possible to determine the maximum quantity of oil discharged irrespective of the force of the pressure exerted. The nozzle aperture is capillary so that, as noted above, oil is ejected by over-pressure only. Thus the oil does not actually flow onto the lubrication point; it is ejected through the nozzle. The quantity of oil ejected is in all events smaller than it would be if the oil were flowing out normally, so that the appliance enables quantities of hitherto unattained minuteness to be discharged.

It may be suitable for certain purposes to bevel the nozzle at the point where the needle projects and to provide the projecting section of the needle with a club-like configuration, the thicker section of the needle beginning, in the idle position of the appliance, at such a distance from the nozzle end as to permit of the plunger being lifted in order to initiate the flow of oil.

In Fig. 2 the nozzle indicated at 9 is bevelled at the point where the needle 8 emerges. The purpose of this particular arrangement of nozzle and needle is, briefly, the following:

Experience has shown that lubrication of the movements of watches is not always possible with the nozzle configuration according to Fig. 1 because it is not possible to reach below the wheels with such an appliance. The bevelled nozzle, however, permits of reaching below the wheels and effecting lubrication. The club-like configuration of the needle section projecting beyond the nozzle causes said needle to seal off the nozzle as soon as the needle is pressed into the appliance for the purpose of effecting lubrication.

It is understood that it is also possible to employ a needle point of club-like configuration in appliances the nozzle of which is not bevelled. On the other hand it may prove suitable for certain uses of the appliance to employ a bevelled nozzle with a normal needle.

Finally, the needle 8 may also be of conical configuration and guided in a nozzle specially mounted on the appliance. Such a design, which is particularly suitable for special watch constructions, is shown in Fig. 3.

Practical tests with the appliance described have shown that said appliance meets all requirements relative to a lubricating appliance for precision instruments.

I claim:

1. In a lubricating appliance for watches and the like, a casing shaped like a propelling pencil and containing an oil reservoir, a plunger disposed in said reservoir at an end thereof and fully exposed to the oil therein, spring means urging said plunger against said end of the reservoir, said reservoir adjacent said end being shaped to accommodate said plunger for slidable movement toward and away from said end with play between the sides of the plunger and the reservoir to permit the passage of oil, means providing a passageway connecting said end of the reservoir with the outer surface of the casing, said plunger closing the reservoir terminal of said passageway when seated against said end of the reservoir, a needle carried by said plunger and extending through said passageway with its tip projecting from said casing, the annular space under the plunger between the needle and passageway being non-capillary, and a nozzle constituting the outlet terminal of the passageway, the annular space between the needle and nozzle being capillary, whereby when the plunger is displaced from said end oil will flow around and under the plunger into the first annular space but not through the second annular space, and thereafter when the spring means urges the plunger back against said end oil will flow along the needle through said second annular space, the pressure of the oil under the plunger as it is urged against said end being in part dissipated by return of oil around the sides of the plunger back into the reservoir.

2. In a lubricating appliance for watches and the like, a casing shaped like a propelling pencil and containing an oil reservoir, a plunger disposed in said reservoir at an end thereof and fully exposed to the oil therein, spring means urging said plunger against said end of the reservoir, said reservoir adjacent said end being shaped to accommodate said plunger for slidable movement toward and away from said end with play between the sides of the plunger and the reservoir to permit the passage of oil, means providing a passageway connecting said end of the reservoir with the outer surface of the casing, said plunger closing the reservoir terminal of said passageway when seated against said end of the reservoir, a needle carried by said plunger and extending through said passageway with its tip projecting from said casing, the annular space under the plunger between the needle and passageway being non-capillary, and a beveled nozzle constituting the outlet terminal of the passageway, the annular space between the needle and nozzle being capillary, whereby when the plunger is displaced from said end oil will flow around and under the plunger into the first annular space but not through the second annular space, and thereafter when the spring means urges the plunger back against said end oil will flow along the needle through said second annular space, the pressure of the oil under the plunger as it is urged against said end being in part dissipated by return of oil around the sides of the plunger back into the reservoir.

3. In a lubricating appliance for watches and the like, a casing shaped like a propelling pencil and containing an oil reservoir, a plunger disposed in said reservoir at an end thereof and fully exposed to the oil therein, spring means urging said plunger against said end of the reservoir, said reservoir adjacent said end being shaped to accommodate said plunger for slidable movement toward and away from said end with play between the sides of the plunger and the reservoir to permit the passage of oil, means providing a passageway connecting said end of the reservoir with the outer surface of the casing, said plunger closing the reservoir terminal of said passageway when seated against said end of the reservoir, a needle carried by said plunger and extending through said passageway with its tip projecting from said casing, the annular space under the plunger between the needle and passageway being non-capillary, and a nozzle constituting the outlet terminal of the passageway, the annular space between the needle and nozzle being capillary, whereby when the plunger is displaced from said end oil will flow around and under the plunger into the first annular space but not through the second annular space, and thereafter when the spring means urges the plunger back against said end oil will flow along the needle through said second annular space, the pressure of the oil under the plunger as it is urged against said end being in part dissipated by return of oil around the sides of the plunger back into the reservoir, the tip of the needle being enlarged to close the nozzle when the needle is pressed toward the casing.

References Cited in the file of this patent

UNITED STATES PATENTS

| Number | Name | Date |
| --- | --- | --- |
| 11,612 | Landmann | Aug. 29, 1854 |
| 247,488 | Elliott | Sept. 27, 1881 |
| 281,903 | McKenzie | July 24, 1883 |
| 697,700 | Alden | Apr. 15, 1902 |
| 925,794 | Aune | June 22, 1909 |
| 1,600,095 | Casaclang | Sept. 14, 1926 |
| 1,686,188 | Tipton | Oct. 2, 1928 |
| 2,051,672 | Baker | Aug. 18, 1936 |

FOREIGN PATENTS

| 247,767 | Switzerland | Dec. 16, 1947 |